Sept. 2, 1952  S. A. DILLON  2,609,164
SPLIT ENGINE COVER
Filed Nov. 2, 1950

Inventor
SAMUEL A. DILLON
By
Walter S. Pawl.
Attorneys

Patented Sept. 2, 1952

2,609,164

UNITED STATES PATENT OFFICE 2,609,164

SPLIT ENGINE COVER

Samuel Arthur Dillon, United States Navy

Application November 2, 1950, Serial No. 193,697

9 Claims. (Cl. 244—1)

(Granted under the act of March 3, 1883, as amended April 30, 1928; 370 O. G. 757)

The present invention relates to an engine cover especially adaptable to fit over aircraft engines and protect them from the salt spray, ice, and water encountered on aircraft carriers.

The engine covers now in use require the services of several men to climb up on the engine, lift the cumbersome and heavy canvas or tarpaulin, and knot stiff and unwieldy ropes, usually when weather and ship movement conditions necessitate the wearing of heavy gloves.

The present invention has for its object the provision of a sectional cover of fabric combined with a brace which may be quickly and removably attached to the engine propeller blade.

Another object is to provide for an engine cover which will pack flat when out of service.

A further object is to provide an engine cover of such design that one man can easily and rapidly assemble it over the engine without having to climb on the engine or stand upon a ladder or other support.

The use of any ladder or support on aircraft carriers is extremely hazardous, especially so in weather when aircraft engines require protection from the elements and salt spray.

Other objects and features of the invention will become apparent to those skilled in the art as the disclosure is made in the following detailed description of preferred embodiments of the invention as illustrated in the accompanying sheet of drawing in which.

Figure 1:
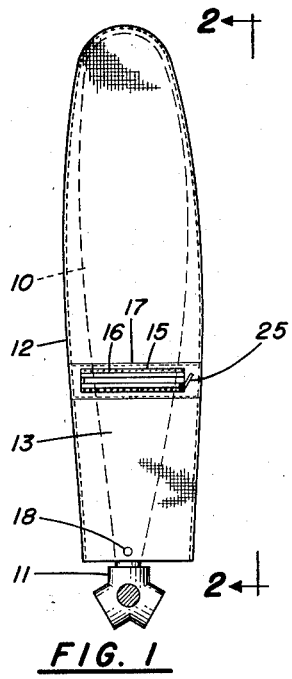
Fig. 1 shows a view in elevation of the portion of the engine cover on one propeller blade.
Figure 2:
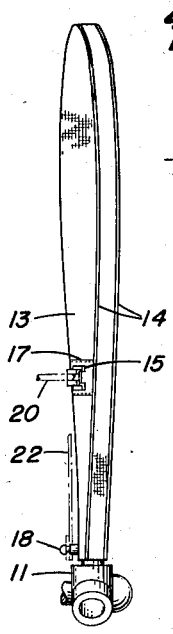
Fig. 2 shows a side view in elevation taken on line 2—2 of Fig. 1.
Figure 3:
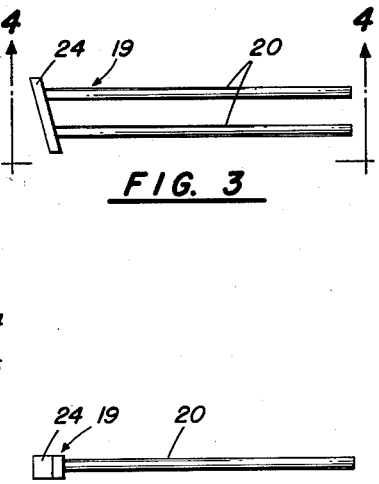
Fig. 3 shows a view in elevation of the rod support.
Figure 4:
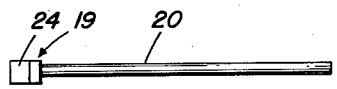
Fig. 4 shows a side view taken on line 4—4 of Fig. 3.
Figure 5:
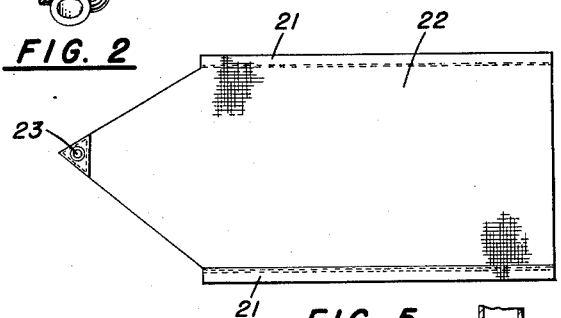
Fig. 5 shows a plan view of one section of the fabric covering laid flat.
Figure 6:
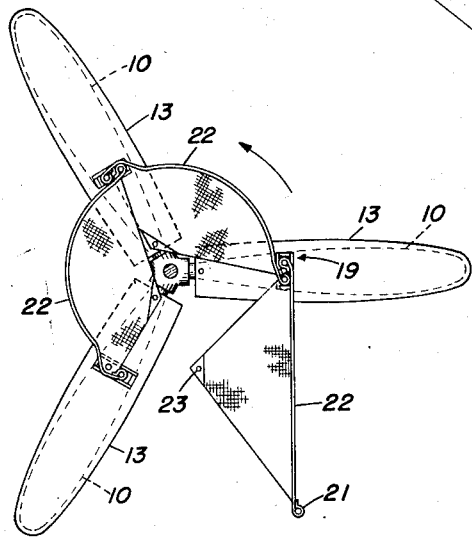
Fig. 6 shows the rear side of a three bladed propeller with the flap secured in place but with the engine apparently removed.

Referring to the drawing in which like numerals indicate like parts throughout the several views, in Figs. 1 and 2 one of the aircraft's propeller blades is shown at 10, with hub 11 shown in partial view. The engine cover 12 consists in part of a sleeve 13 of canvas or other fabric sewed along one or both sides with in-folded edges 14 to act as stiffeners. On one side is attached channel socket 15, securely fixed to the fabric sleeve by other stitching 16 and reinforcing fabric 17. A snap grommet 18 is fastened to the sleeve 13 substantially at the center of the hub 11. Figs. 3 and 4 show the rod support 19 formed of lightweight cast metal or other strong and stiff material, and having a pair of arms 20 for inserting in the hemmed edges 21 of the sheet 22 shown in Figs. 5 and 6. A matching grommet or snap 23 is in the flap end of the sheet 22, which is cut to substantially the same angle as the angle between the propeller blades. The base 24 of the rod support fits into the channel socket 15, as shown in Fig. 6, and as is readily seen from the drawing, arms 20 project rearwardly over the engine, slightly angled to the base 24 to match the blade angle.

A spring snap 25 at the open end of channel 16 holds the base 24 from slipping out.

Figure 7:
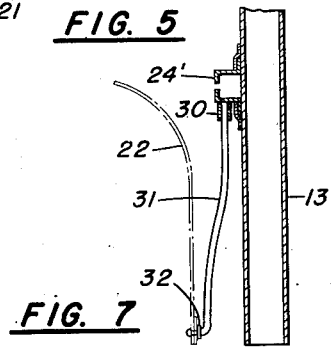
Fig. 7 shows a modification of the flap securing means.

In Fig. 7, a second means is shown of securing the flap ends of the sheets 22 between the propeller blades. The base 24' has a socket 30 on the side toward the propeller root and after the sheets 22 have been placed on the arms 20 and pulled over the engine, a partially bent spring rod 31 having a shoulder 32 near one end is slipped into the socket 30 and after further bending by hand is engaged with the ring 23 as far as the shoulder 32. The spring rod 31 then tends to keep the flap end of the sheet 22 towards the hub of the propeller.

In operation, which is easily understood by examination of the several aforesaid views, the sleeve 13 is slipped over one blade of the propeller 10, generally over the blade which is horizontal and on the ascendency as the engine is hand turned, the rod support 19 is slipped into the channel socket 15, and one edge of the sheet 22 is pulled over the upper of the arms 20.

The engine is then hand turned to bring the first blade upright and another blade into the first position. Another sleeve 15 and rod support 19 are similarly positioned, with the hemmed edge of the first sheet 22 enclosing the lower of the arms 20. It will be seen, therefore, that as a sleeve, rod support, and sheet are added, the rising propeller covers the engine by dragging the sheets 22 over the engine and down the other side, and that due to inserting the arms 20 in the hemmed edges 21 in overlapping fashion as shown in Fig. 6, the engine is given adequate protection and the whole operation of covering the engine has not required a ladder or the lifting of one piece of cumbersome and relatively unwieldy covers. The sleeves 13 are then secured to the several sheets 22 by the matching of the grommets 18 and 23, which may be of any conventional design such as a male stud with locking button on the sleeve 13, and female rings 23 on the sheets 22. When in out-of-service condition, the sleeves 13, sheets 22, and rod supports 19 are relatively flat and may be flat packed or rolled in groups as applicable to the aircraft's number of propeller blades, here illustrated as three in number.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States for governmental purposes without the payment of any royalties thereon or therefor.

I claim:

1. A protective cover for an aircraft engine comprising a plurality of fabric sleeves adapted to be slipped one each over the engine's propeller blades, a channel-shaped member secured to each sleeve at a distance from the propeller hub approximately equal to the radius of the engine, a U-shaped member for each blade having a base adapted to fit in said channel-shaped member the arms of which extend substantially the engine length, and fabric means adapted to be supported on the arms of said U-shaped member to cover said engine.

2. The device as set forth in claim 1 and snap-and-grommet means on said fabric sleeves and said fabric means respectively to secure said fabric means near the hub of the propeller.

3. The device as set forth in claim 1 and a semi-stiff rod seatable in said channel-shaped member and in a grommet on said fabric means to secure said fabric means near the hub of the propeller.

4. The device as set forth in claim 1 and means secured to each of said fabric sleeves to hold a portion of said fabric means over the front of the engine and behind the propeller.

5. A weather cover for a multi-bladed aircraft engine capable of being applied from a position not higher than the engine comprising a protective sleeve for each blade of the propeller of said engine, at least one rod removably secured to each sleeve extending rearwardly therefrom and at substantially a right angle thereto, a plurality of fabric panels each having rod-engaging means along opposite edges, each of said panels constructed and arranged to be engaged by rods on adjacent sleeves and to be pulled in turn by said rods up and over said engine when said propeller is rotated with one of said sleeves on each blade.

6. The device as set forth in claim 5 in which there are two of said rods on each sleeve for engaging one edge each of two of said panels, and said rods are radially equidistant from the propeller hub in assembled condition.

7. The device as set forth in claim 6 in which said panels are dimensioned to engage on each side the distant one of the two rods on each sleeve whereby adjacent panels overlap along their rod-engaged edges.

8. The device as set forth in claim 7 and a triangular portion on each of said panels constructed and arranged to cover the front of the engine near the propeller hub.

9. The device as set forth in claim 8 and coacting means on said sleeves and said triangular portions for holding said portions in place over the engine near the propeller hub.

SAMUEL ARTHUR DILLON.

REFERENCES CITED

The following references are of record in the file of this patent:

FOREIGN PATENTS

| Number | Country | Date |
|--------|---------|------|
| 348,263 | Italy | May 15, 1937 |
| 348,523 | Italy | May 21, 1937 |